Patented Oct. 24, 1922.

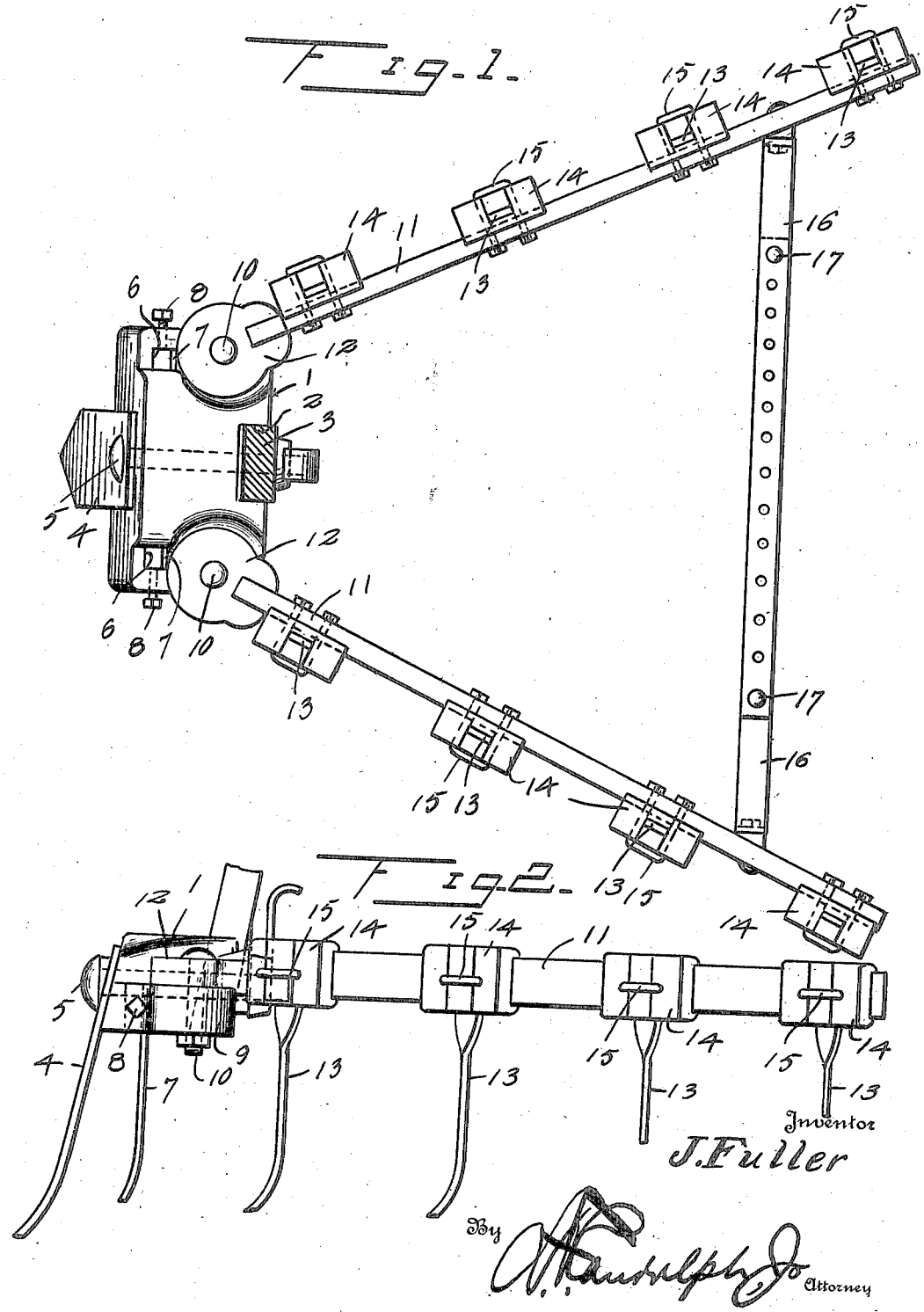

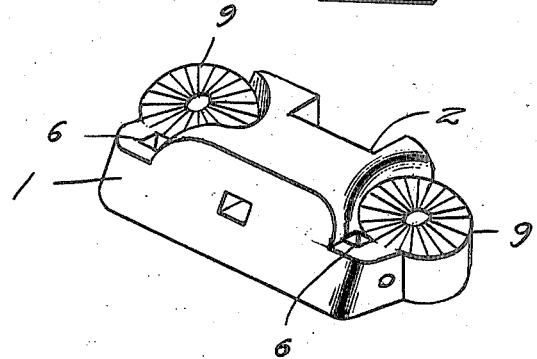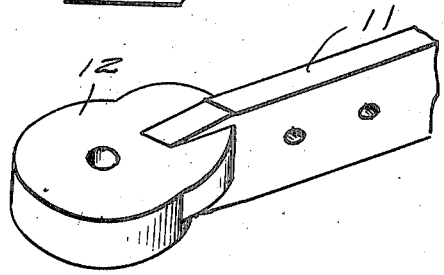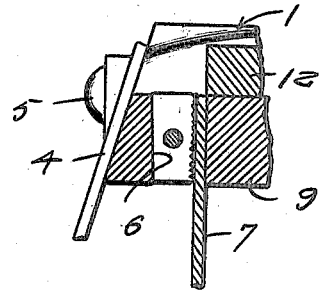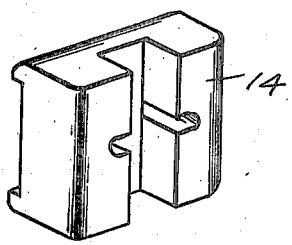

1,433,365

UNITED STATES PATENT OFFICE.

JOE FULLER, OF SUMRALL, MISSISSIPPI.

CULTIVATOR ATTACHMENT.

Application filed July 3, 1921. Serial No. 483,272.

*To all whom it may concern:*

Be it known that I, JOE FULLER, a citizen of the United States, residing at Sumrall, in the county of Lamar and State of Mississippi, have invented certain new and useful Improvements in Cultivator Attachments; and I do hereby declare the following to be a full, clear, and exact description of the invention, such as will enable others skilled in the art to which it appertains to make and use the same.

The invention relates to farming implements for truck gardening and provides an attachment which may be utilized for cultivating or harrowing or for preparing bedded land ahead of the planter and at the same time when sowing the seed.

The attachment is interchangeable with the ordinary plow shovel and may be attached to the standard or plow stock by a bolt in substantially the same manner as the plow shovel.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Figure 1 is a top plan view of the attachment.

Figure 2 is a side view thereof.

Figure 3 is a detail perspective view of the head.

Figure 4 is a detail perspective view of the forward portion of one of the bars.

Figure 5 is a sectional detail on the line *x—x* of Figure 1, and

Figure 6 is a detail perspective view of one of the tooth receiving blocks.

Corresponding and like parts are referred to in the following description and designated in the several views of the drawings by like reference characters.

The attachment comprises a head 1 which consists of a block having a notch 2 in its rear side to receive the plow standard or stock 3. The front side of the head 1 is preferably flat and inclined slightly to receive a cultivator blade 4 and give the proper set thereto. A bolt 5 extending transversely through the head 1 serves to secure the cultivator blade 4 thereto and fastens the head 1 to the plow standard or stock 3. Vertical openings 6 are formed in opposite end portions of the head 1 and receive teeth 7, the latter being secured in the openings in the required adjusted position by means of clamp screws 8. The head 1 is so formed at opposite ends in the rear of the openings 6 to provide approximately circular portions 9 which are centrally apertured to receive bolts 10 whereby bars 11 are secured to the head 1 in the required adjusted position. The circular portions 9 of the head 1 appear on the top side thereof and constitute seats for the reception of the circular ends 12 of the pivoted bars 11. The circular ends 12 fit the seats 9 snugly and are centrally apertured to receive the bolts 10. The opposing faces of the seats 9 and circular ends 12 are toothed whereby to provide positive interlocking ends to retain the bars 11 in the required adjusted position. In the preferable construction the head 1 consists of a substantial casting which is so formed as to be comparatively light and capable of resisting the strain to which it will be subjected in service.

The bars 11 are of like formation, each having its forward end flattened and made round to provide the circular portion 12 to match the circular seats 9. Teeth 13 are located at intervals in the length of the bars 11 and are secured thereto by means of blocks 14 and U-bolts 15. The blocks 14 are recessed in opposite sides to receive a bar 11 and a tooth 13. The U-bolts 15 securing both the teeth 13 and the blocks 14 to the bars 11. Straps or like connections 16 attached to the rear portions of the bars 11 serve materially to secure the same in the required adjusted position. The straps or connections 16 overlap and are formed with a plurality of openings to receive bolts 17 whereby the rear ends of the bars 11 may be spread more or less as required.

An attachment constructed substantially as herein indicated is adapted for use by being attached to the standard or stock 3 of an ordinary plow after the plow shovel has been removed. The tooth carrying bars 11 may be adjusted to any relative angle within their range of movement and are made secure in the adjusted position by means of the connections 16 which constitute stays. The bars 11 may be inclined forwardly or rearwardly according to the nature of work in hand when preparing fitted land for planting, the bars 11 are inclined forwardly, but for ordinary purposes of cultivating the bars 11 are inclined rearwardly. It is to be understood that one or the other of the bars 11 may be omitted if desired according to the particular result to be attained. When one of the tooth carrying bars 11 is omitted the attachment cultivates one side of a row only and when both bars are in position, both sides of a row are cultivated at the same time as will be readily understood.

Having thus described the invention, what I claim is:—

1. A cultivator attachment of the character specified comprising a head having its front side flat and inclined to receive a blade and having its rear side notched to receive a plow standard, and having a bolt opening extending through the front and rear, and having horizontally disposed circular seats and vertical tooth receiving openings at opposite ends.

2. In a cultivator attachment of the character specified, a head provided in its rear side with a recess for receiving a plow stock and having vertical openings in opposite end portions for the reception of teeth and having circular seats in the rear of the vertical openings for receiving the circular ends of tooth carrying bars which are adapted to be pivotally and adjustably connected thereby.

In testimony whereof I affixed my signature in presence of two witnesses.

JOE FULLER.

Witnesses:
 JNO. L. ADAMS,
 W. D. EASTERLING.